June 25, 1963     J. HILL     3,094,766
METHOD OF ASSEMBLING A SEMI-CONDUCTOR
Filed Dec. 18, 1959     6 Sheets-Sheet 1

INVENTOR.
JOHN HILL
BY
*Eber J. Hyde*
ATTORNEY

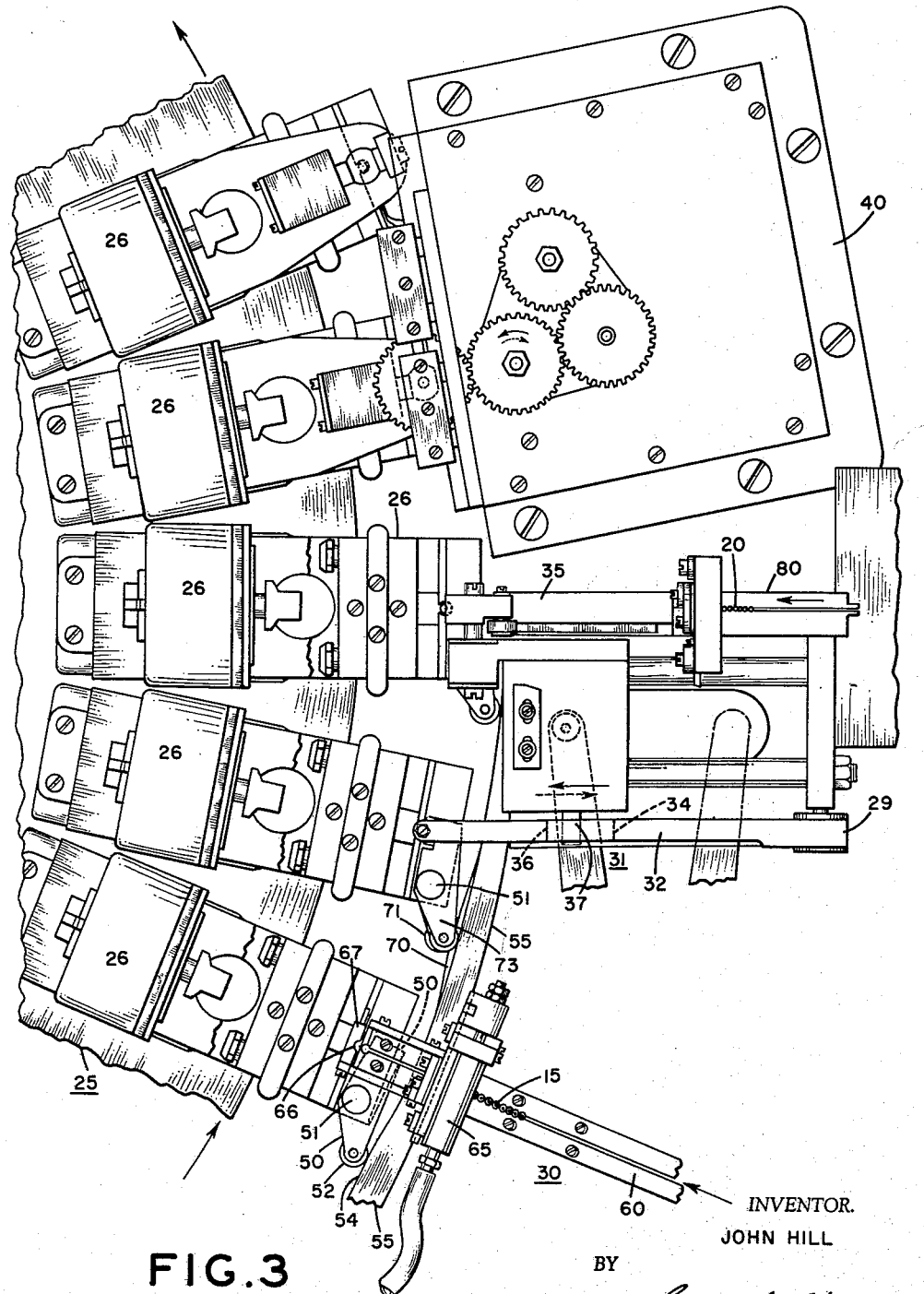

June 25, 1963 J. HILL 3,094,766
METHOD OF ASSEMBLING A SEMI-CONDUCTOR
Filed Dec. 18, 1959 6 Sheets-Sheet 3

INVENTOR.
JOHN HILL
BY
ATTORNEY

June 25, 1963  J. HILL  3,094,766
METHOD OF ASSEMBLING A SEMI-CONDUCTOR
Filed Dec. 18, 1959  6 Sheets-Sheet 5

INVENTOR.
JOHN HILL
BY
*Eber J. Hyde*
ATTORNEY

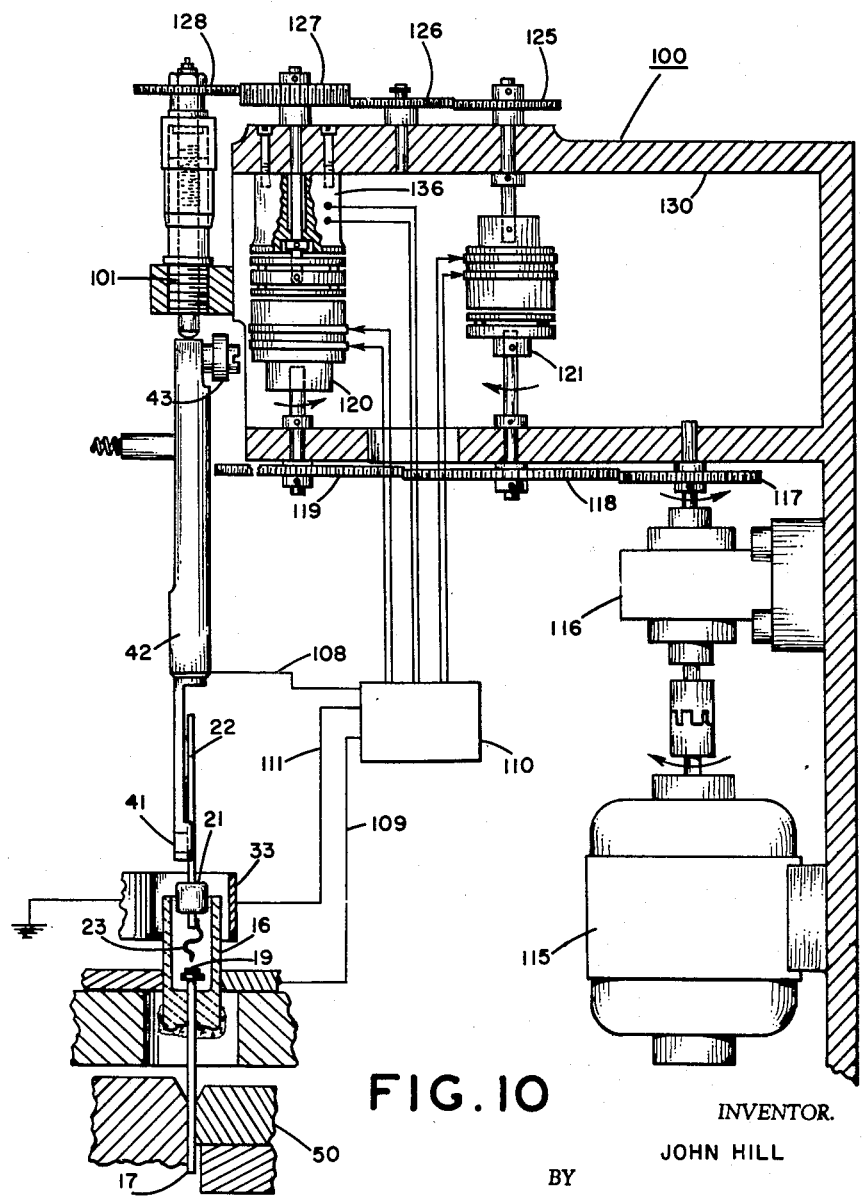

United States Patent Office 3,094,766
Patented June 25, 1963

3,094,766
METHOD OF ASSEMBLING A SEMI-CONDUCTOR
John Hill, Malden, Mass., assignor to Clevite Corporation, Cleveland, Ohio, a corporation of Ohio
Filed Dec. 18, 1959, Ser. No. 860,597
4 Claims. (Cl. 29—25.3)

This invention pertains to apparatus for and the method of assembling two sub-assemblies into a finished product, and more particularly to assembling two very small sub-assemblies in a very precise manner to form a semi-conductor device such as a diode.

The diode made in accordance with the present invention is comprised of a first sub-assembly formed of a glass tube or cup within which there is mounted on a lead wire a semi-conductive wafer of germanium or silicon or the like, the lead wire being sealed through the enclosed base of the glass tube or cup; and a second sub-assembly comprised of a glass bead through which there is sealed a second lead wire and on one end of this lead wire there is a cat's whisker of gold wire, or the like.

The problem solved by the present invention is to automatically and very rapidly and accurately bring together the two sub-assemblies so that the cat's whisker engages the semi-conductive wafer with a given, very critical, amount of pressure, whereupon the whisker is welded or alloyed to the wafer and the glass bead is fused in the open end of the glass tube or cup to completely enclose the cat's whisker and the wafer in a sealed glass enclosure.

The semi-conductive diode is very small, the glass enclosure being about ¼" long and only about .095"±.002" in diameter; the semi-conductive wafer is only about .002" thick and the gold wire is 2 mil. During assembly the cat's whisker engages the wafer with a positional relationship accurate to about one half of a tenth of a thousandth (.00005"), and the glass bead must fit very closely within the open end of the glass tube so that the two can be fused together. In spite of this very high degree of dimensional accuracy the two sub-assemblies must be very quickly assembled in order for the final product to economically compete for sales in industry. Thus it becomes essential that automatic machinery be provided which is rapid and highly accurate.

The automatic machinery must position the glass bead within the glass tube prior to fusing the two parts together, because if the parts are misaligned sideways the finished product will have a relatively thick glass wall to one side and will have a relatively thin glass wall to the opposite side. Also, the side walls of the enclosure will not be straight. In spite of an annealing cycle to which each assembled diode is exposed, those diodes which have misaligned tubes and beads have a very high failure rate when they are subjected to a rigorous temperature cycling and vibration or shock test. The failure is due to unannealed stresses in the thick-thin glass portions. Also, if the glass bead extends too far into the glass tube, or does not extend far enough into the tube at the time of fusing, high rejection rate of the finished product is experienced. It will be seen therefore, that two very small sub-assemblies must be electrically and mechanically connected together with a very high degree of accuracy.

It is an object of the present invention to provide automatic machinery for and a method of assembling semi-conductor diodes.

Another object of the present invention is to provide automatic machinery for assembling semi-conductor diodes or the like, wherein very close tolerances are observed, by quickly making rough indexing movements and by thereafter very carefully making the fine indexing movements of one sub-assembly with respect to another.

Still another object of the invention is to fuse, weld or alloy a cat's whisker to a semi-conductive wafer by production machinery, the operation taking place only after a predetermined very critical, positional relationship is achieved between the whisker and the wafer.

Still another object of the present invention is to provide a device and system for quickly, yet very accurately, positioning a cat's whisker with respect to a semi-conductive wafer.

Another object of the invention is to provide mechanism for quickly, yet very gently, turning a very delicate sub-assembly end-for-end.

Still another object of the invention is to provide mechanism for quickly, yet very gently, taking a delicate sub-assembly from a feed device and handing it to an assembly device.

Still another object of the invention is to provide a quick acting end-for-end reversal mechanism which simultaneously takes a delicate device from one station and hands it off to another station.

A further object of the invention is to position a glass sub-assembly in a heater using a portion of the heater as the reference in order that the sub-assembly is in the preferred location when it is fused by the heater to another sub-assembly.

In other devices the glass sub-assembly, hereafter sometimes called the "first seal," is positioned in a hole or V-shaped notch in a positioning plate with the bottom of the sub-assembly resting on the plate. Thereafter the second sub-assembly (second seal) is indexed toward the first seal. This procedure is not sufficiently accurate because the bottom surface of the first seal is irregular due to the melting of the glass necessary to seal a lead wire through the bottom wall of the tube forming the first seal. If the position of the first seal is inaccurate it makes no difference how accurately the second seal is positioned; their positional relationship is not accurate.

A further object of the present invention is to provide a method of assembling a first seal to a second seal, wherein the positional relationship of the first seal is determined by indexing the first seal with respect to a reference surface on the heater device which ultimately fuses together the two sub-assemblies, and by using the top surface of the first seal as its reference surface.

For a better understanding of the present invention, together with other and further objects thereof, reference is had to the following description taken in connection with the accompanying drawings, and its scope will be pointed out in the appended claims.

With reference to the several sheets of drawing:

FIGURE 3 is a plan view of a portion of the rotary turret-type of turn table for automatically connecting together the two sub-assemblies.

FIGURE 10 is a sectional view taken through the fine position mechanism, showing the means for pushing the cat's whisker of the second sub-assembly onto the semi-conductive wafer of the first sub-assembly.

An aspect of the invention lies in the provision of a method for assembling a first and a second seal device which comprises holding the first seal device in a heater by means of gripping mechanism in engagement with the sides of the seal device at a location above the bottom thereof. Thereafter the first seal device is pushed down within the heater using a pushing arm until the pushing arm engages the heater thereby positively and accurately locating the first seal device in respect to the heater irrespective of deformities on the bottom of the seal device. Thereafter the second seal device is indexed into close proximity to the first seal device and the heater is energized to fuse together the two seal devices.

Figure 1:
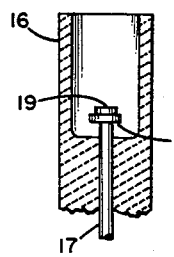
FIGURE 1 is a greatly enlarged sectional view of the first sub-assembly comprised of a glass tube surrounding a wafer of semi-conductive material, sometimes called a "first seal."

With reference to the drawings, there is shown greatly enlarged at FIGURE 1 a glass tube sub-assembly 15, also called a "first seal," comprising a short length of glass tube 16 closed at one end around a lead wire 17. Inside the glass tube 16 there is a small amount of solder 18 on the end of lead wire 17, and there is a small semi-conductive wafer 19 of germanium, silicon or the like mounted on the solder 18 and thereby in electrically conductive contact with the lead wire 17.

Figures 2, 6:
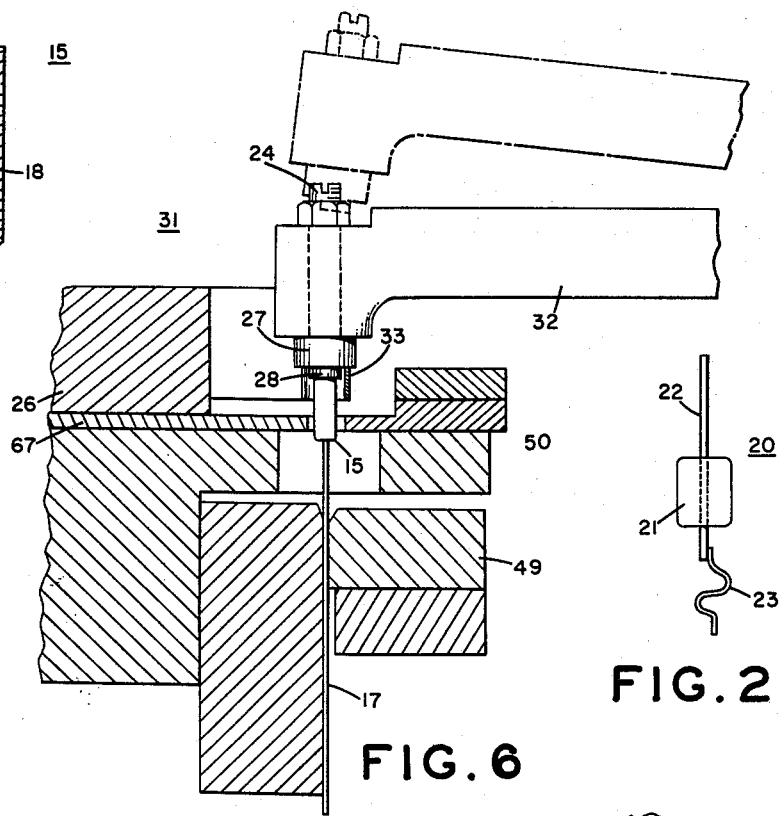
FIGURE 2 is a greatly enlarged side view of the second sub-assembly, also called a cat's whisker or anode sub-assembly, which is to be automatically connected to the first sub-assembly to form a diode. This sub-assembly is sometimes called a "second seal."
FIGURE 6 is an enlarged sectional view showing the station where the first sub-assembly is positioned in the turntable.

FIGURE 2, also greatly enlarged, shows the cat's whisker sub-assembly 20 of a germanium diode which is comprised of a glass bead 21 sealed around a lead wire 22, and a very fine wire 23 of gold or the like is connected to the lead wire 22. This sub-assembly is also called a "second seal."

General Arrangement

The apparatus and method of the present invention are designed to quickly assemble the glass tube sub-assembly 15 and the cat's whisker sub-assembly 20, with the cat's whisker 23 in engagement with the semi-conductive wafer 19 with a given, rather critical, amount of pressure, and thereafter to weld, fuse or alloy the cat's whisker to the wafer, and thereafter the glass bead 21 is fused to the inside walls of the glass tube 16 to seal the unit, thereby completing a semi-conductive device to form a diode or the like.

Figure 4:
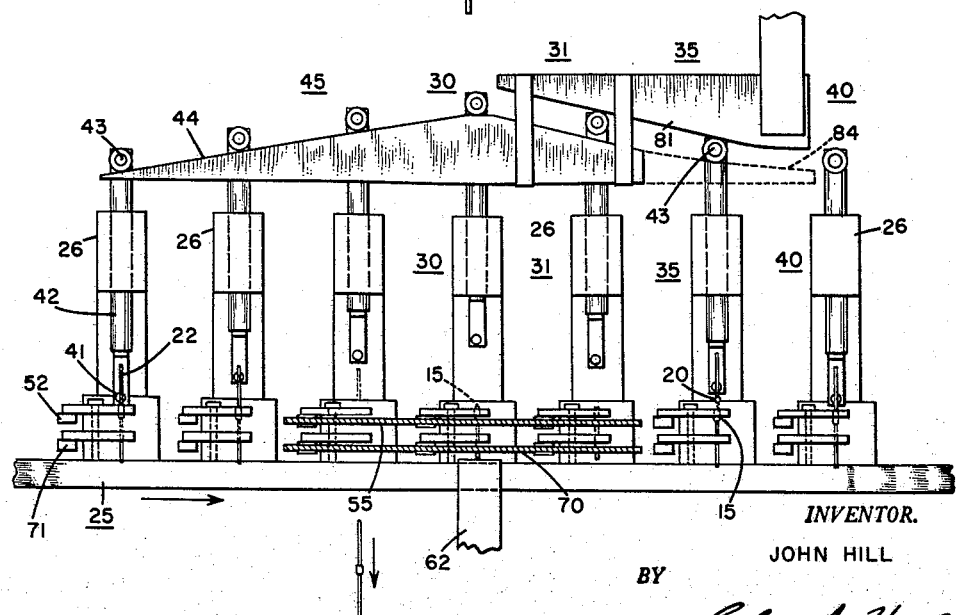
FIGURE 4 is a side view of a small portion of the turntable shown in FIGURE 3.

FIGURES 3 and 4 show plan and side views of the apparatus for assembling the two sub-assemblies 15, 20. The apparatus comprises a rotatable turret or table 25 which carries with it a large number of holders 26 for rotation past a succession of stationary work stations mounted around the periphery of the work table 25. The table 25 rotates in steps, with 45 seconds of motion and 2 minutes 15 seconds of stationary time.

FIGURE 3 is a plan view showing a portion of the work table 25 and a plurality of holders 26. As each work holder 26 passes the first work station 30 a glass tube sub-assembly 15 (first seal) is roughly positioned in the work holder 26, by mechanism shown in detail in FIGURE 5. The work table 25 rotates the loaded work holder 26 to the next work station 31 where a positioning arm 32 gently pushes the glass tube sub-assembly 15 inside a heater coil 33, using the top surface of the heater coil as an index stop to obtain a high degree of positional accuracy between the first seal and the heater, as shown in detail in FIGURE 6. Thereafter the work table rotates the accurately positioned glass tube sub-assembly to the third work station 35 where a cat's whisker sub-assembly 20, or "second seal," is handed from a supply station 80 to the work station or holder 26 by the mechanism shown in detail in FIGURES 7 and 8. Thereafter the work table moves the roughly positioned two sub-assemblies 15, 20 to the fourth or fine positioning work station 40, shown in detail in FIGURES 9 and 10, where the two sub-assemblies are carefully, yet quickly, adjusted into contact with each other, and a timer circuit is made which, at the proper instant, alloys the cat's whisker to the semi-conductive wafer. Thereafter the heater coil 33 is energized to fuse the glass bead 21 within the glass tube 16.

The work table is sufficiently large in diameter that the heater coil 33 will have adequate time to fuse the two glass parts together, and to allow for an annealing period prior to unloading the assembled diodes. The assembled diodes are unloaded from a given work holder 26 after the table 25 has rotated a given amount and just prior to that work holder entering a subsequent first work station 30. In practice the table 25 has two complete assembly mechanisms so that a diode is assembled, cooled and discharged in approximately 180 degrees of table travel.

Figure 8:
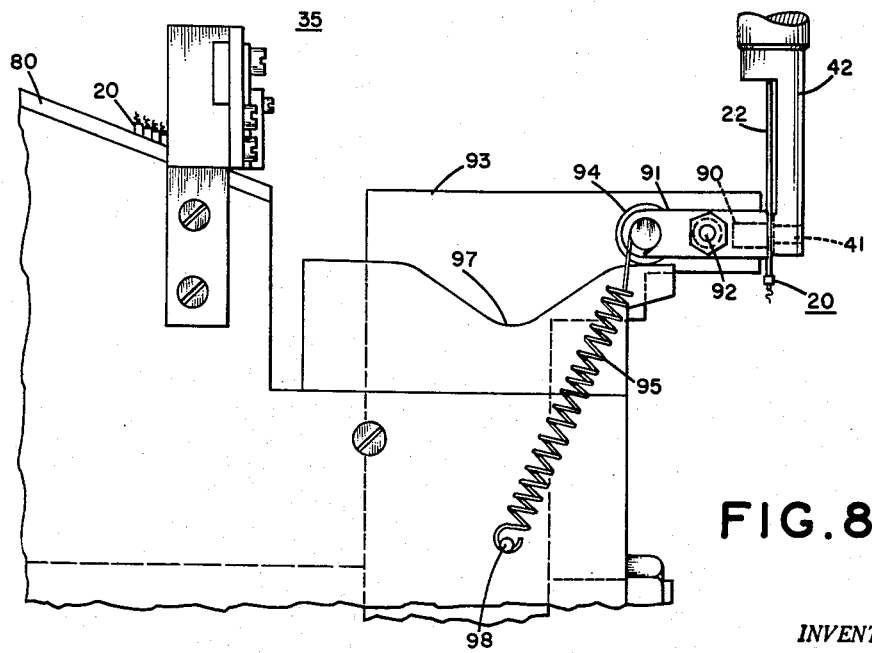

FIGURE 4 shows one method of causing the work holders 26 to discharge an assembled diode and subsequently to receive a sub-assembly 15. The lead wire 22 of the glass bead sub-assemblies is made of magnetizable wire, and, as shown in FIGURE 8, a magnet 41 mounted in a magnet arm 42 holds it in place. When a given work holder 26 moves completely past the several work stations and the assembly of the diode is completed, the magnet arm 42 which has a roller 43 on its top end, engages an inclined cam face 44, causing the magnet arm 42 to rise. The diode assembly is held by a clamped jaw, as will later be described in detail. Consequently, the magnet arm 42 and the magnet 41 are pulled away from the magnetizable wire 22, and subsequently the clamping jaws are opened, allowing the assembled diode to drop into a collecting bin, not shown, at an unloading station 45.

First Work Station

Figure 5:
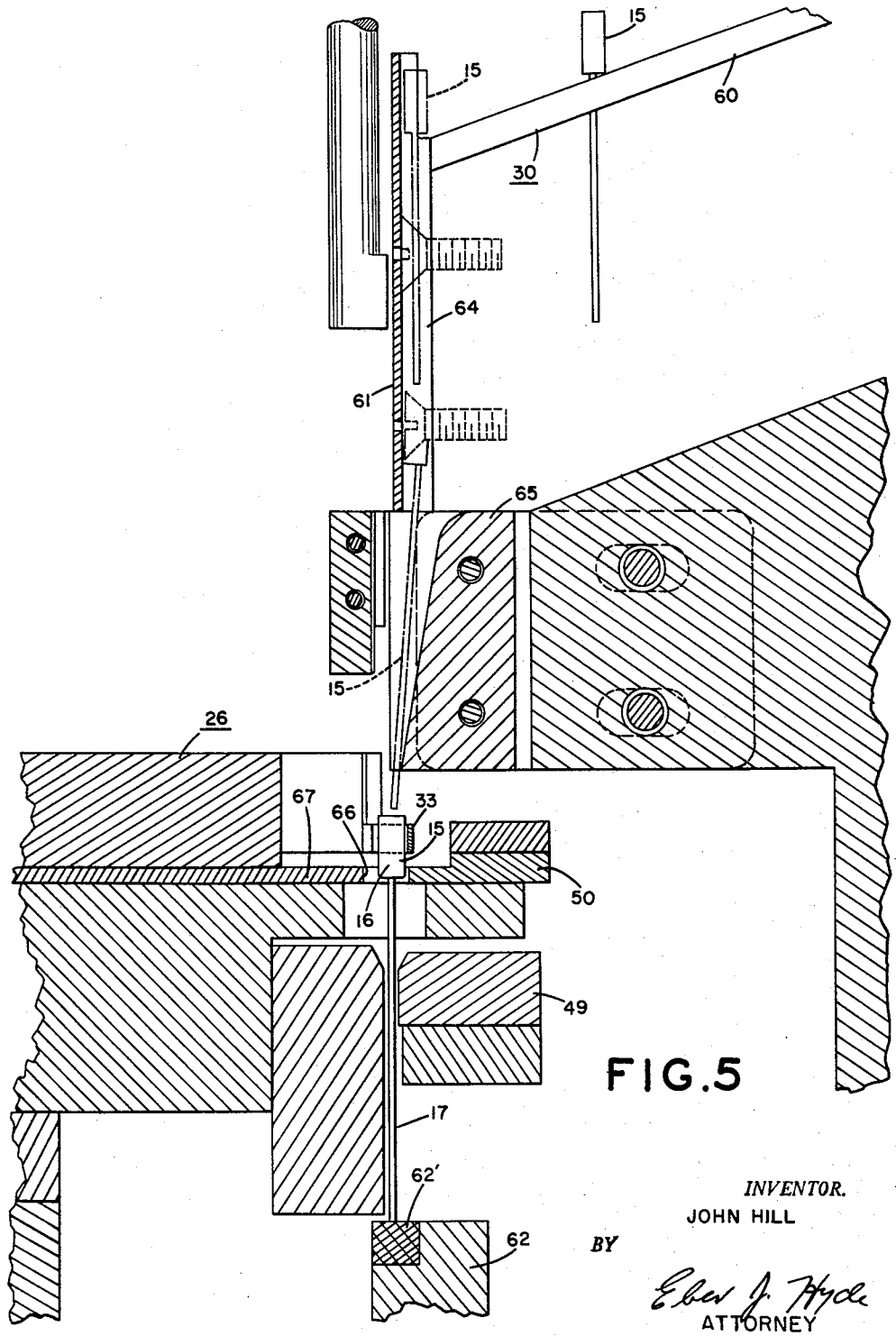
FIGURE 5 is an enlarged sectional view showing the loading station for the first sub-assembly.

Referring to FIGURES 3 and 5, the first work station 30 comprises stationary feeding mechanism outside the periphery of the rotatable work table 25 for feeding to each work holder 26 as it passes one of the "first seal" sub-assemblies 15. The feeding mechanism comprises an inclined track 60 which holds a plurality of the "first seals" 15, and which feeds them one at a time down a chute 64, through an aligning and feeding element 65, through the heater coil 33, through a V opening 66 in an accurately positioned plate 67, to cause the lead wire 17 to engage a magnet 62' set in the anvil 62. The anvil 62 is located under the heater 33 only at this work station 30, as will be seen in FIGURE 4. The work table is stationary while the first seal 15 drops into place, and thereafter the work table rotates to index the loaded work holder 26 to the second work station 31.

As the loaded work holder 26 moves from station 30 to station 31 lower and upper clamping jaws 49, 50 clamp respectively on the lead wire 17 and the glass portion 16 of the subassembly, and thereafter the lead wire 17 slides laterally off the anvil 62 so that the sub-assembly is entirely supported by the clamping jaws 49, 50. The clamping jaws 49, 50 are actuated by an upper cam follower device or roller 52 connected to the jaws 49, 50 which are mounted by pivot 51 to the rotatable work table 25. A spring 53 (FIG. 9) biases the jaws shut, and the position of the cam follower 52 against raised portions 54 of a stationary cam track 55 overcomes the spring bias and forces open the jaws to permit entry of the sub-assembly between the clamping jaw and the V plate 67. At this point in the rotation of the loaded work holder 26, both the top and bottom jaws 50, 49 are closed securely on the first seal assembly 15.

As the loaded work holder moves to the second work station 31 the clamping action of the top jaw 50 is relieved slightly by the action of the cam follower 52 on the stationary cam track 55, to permit the glass body 16 to be almost free of the clamping action.

Second Work Station

At the second work station 31 a positioning arm 32

(FIGS. 3, 6) pushes the loosely held sub-assembly 15 further down into proper location in respect to the heater coil 33, using the top surface of the heater coil as a reference. The positioning arm 32 is pivotably mounted at 29 to permit up and down pivoting motion of the other end of the arm. The underneath surface of the arm 32 is a cam face, having a high area 34 and a low area 36. A roller 37 moves back and forth between the high and low cam areas 34, 36 in timed relation to the motion of the table 25, thereby raising and lowering the arm 32 at the proper instants to permit motion of the table and to press down on the loosely positioned first sub-assembly when the work table is stationary.

As shown in FIGURE 6 the end of the arm 32 which engages the first seal 15 to position it, has an engaging portion 28 which touches the first seal 15 during positioning. A larger collar portion 27 engages the top edge of the heater coil 33 thereby to limit the downward motion of arm 32. The position of the engaging portion 28 can be adjusted by the threaded member 24 in respect to the collar 27, thereby to accurately adjust the machine so that the top edge of the glass portion of the first seal is very accurately positioned in regard to the heater coil 33. It will be seen with this construction that the heater coil itself is the reference surface for the positioning of the first seal 15, and that the downward travel of the arm 32 is terminated by the coil 33. It is of great importance that the position of the glass tube 16 within the coil 33 be exact. Otherwise a bad seal is obtained when the glass bead 21 is fused to the tube 16. If the first seal 15 is too low in the heater the glass bead 21 will be too high in respect thereto, and an "underseal" is obtained. An "underseal" is not hermetic and causes rejection of the unit during inspection. If the first seal device 15 is positioned too high in the heater, distortion of the glass body case 16 is obtained during the final fusing operation and again the unit must be rejected. Prior to adopting this positioning system approximately 14% of the production had to be rejected for the above noted two flaws. At the present time with the new method, rejects on some machines run as low as 1% and none of the machines higher than 3%.

After the arm 32 accurately positions the first seal 15 the cam track 55 permits spring 63 to actuate the jaw 50 to clamp the glass portion 16 in the notch 66 in the V plate 67, thereby to very accurately position the glass tube laterally as well as in height.

Thereafter the accurately located sub-assembly 15 moves on to the third work station 35 where the second seal device 20 (FIG. 2) is quickly indexed into positional relationship to the first seal 15.

*Third Work Station*

Figure 7:
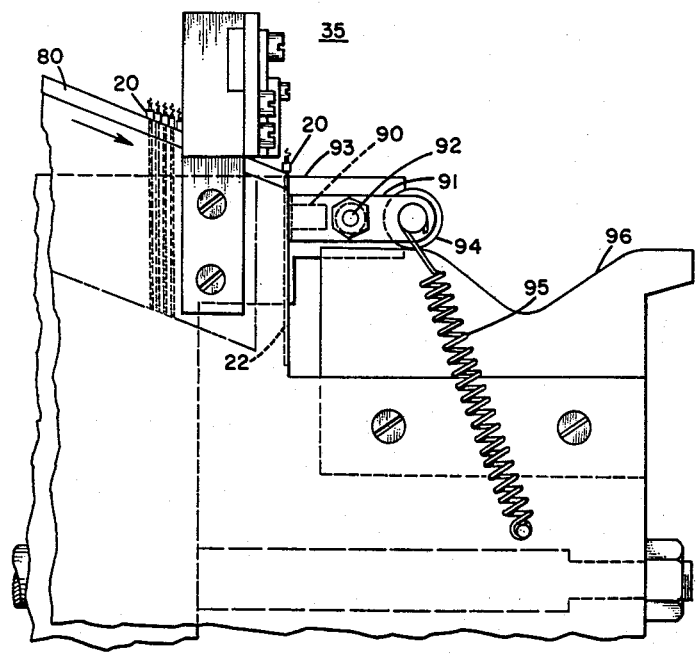
FIGURES 7 and 8 are side views showing details of the mechanism for feeding anode sub-assemblies to the turntable in indexed and oriented relation to the first sub-assembly.

FIGURES 3, 7 and 8 show the anode sub-assemblies 20 arranged in a stationary slide 80 down which they progress toward the rotating work holders 26. As each work holder 26 moves into position at the third work station 35 an anode (second seal 20) sub-assembly holder 42 which includes a magnet member 41 is being pushed downwardly by a roller 43 which is in engagement with the underneath surface of the stationary cam 81 (FIG. 4), and simultaneously the feed mechanism shown in FIGURES 7 and 8 pick up one anode sub-assembly 20 from the slide 80, turn it end-for-end, and place the magnetizable wire 22 of the sub-assembly 20 against the magnet 41 which is part of the holder 42. The feed mechanism then returns to its original position, ready to feed the next sub-assembly 20 to the next work holder 26 as it passes.

The feed mechanism is driven in synchronism with the rotation of the turret 25, and includes a transfer magnet 90 held by transfer arm 91 which is pivoted at 92 to a reciprocating arm 93. The end of the transfer arm 91 opposite the magnet 90 carries a cam follower wheel 94, and a spring 95 holds the cam follower wheel 94 against a cam face 96. As shown in FIGURE 7 the magnet 90 picks up the anode sub-assembly 20 by its wire 22, then as the reciprocating arm 93 is moved to the right the cam follower wheel 94 runs down the cam face 96, the spring 95 holding it against the cam face. When the cam follower wheel 94 reaches the bottom of the cam 96 the transfer arm 91 is in a vertical position and as the wheel 94 moves up the right-hand cam slope the anode sub-assembly 20 is reversed and is presented to the magnet 41. It is essential that the effective strength of the magnet 41 on the wire be greater than the effective strength of the magnet 90 on the wire so that the sub-assembly 20 is held by the magnet 41 as the transfer mechanism moves back to its original position.

In order to achieve the reversal of the arm 91 as it moves from the position shown in FIGURE 7 to the position shown in FIGURE 8, it is essential that the roller 94 be held against the cam face 96 by spring 95 except when the roller reaches the very bottom 97 of the cam face. At this location there should be a slight clearance on the order of .005 to .010" between the cam face 97 and the roller 94, the transfer arm 91 holding the roller away from the cam face. The spring 95 is connected to the reciprocating arm 93 at location 98 which is directly under the lowest point 97 of the cam face. Thus, because of the slight clearance between the roller and the cam face, and because of the spring location a slight "snap action" is imparted to the arm 91 to cause it to mount the cam face 96 with the arm 91 reversed. This "snap action" does not jar the delicate anode sub-assembly 20 because the clearance between the roller and the cam face is so slight that the roller hardly leaves contact with the cam face.

The turret 25 continues its rotation, and as it does so between work stations 35 and 40 the stationary upper cam face 81 (FIG. 4) indexes the anode sub-assembly 20 downwardly toward the sub-assembly 15 so that the cat's whisker 23 approaches very close to the semi-conductor wafter 19 in the glass tube 16. Thereafter the work station 26 passes out from underneath the cam 81 and a fine index mechanism 100 located at the fourth work station 40 (shown in detail in FIGURES 9 and 10) engages the top of the anode sub-assembly holder 42 and pushes it downward, causing the cat's whisker 23 to engage the semi-conductor wafer 19 with a given, very carefully adjusted pressure, and causing the glass bead 21 to be accurately positioned in the glass tube 16. The mechanism then pulses an electric current which welds or fuses the cat's whisker to the wafer 19, and the electric heater 33 is energized to fuse the glass bead 21 to the inside wall of the glass tube 16.

*Fourth Work Station*

The fine adjustment unit 100 is stationary and comprises a micrometer screw thread device 101 which pushes down on the holder 42 until the cat's whisker 23 engages the wafer 19, at which point an electric circuit is made through wires 108, 109 to a control circuit 110 which includes a timer. The initial circuit starts the timer and at the end of a given very short period of time the advance of the micrometer screw is terminated. The time involved and the rate of the micrometer screw advance are such that there is established an engagement between the cat's whisker 23 and the wafer 19 with a certain degree of force. As the timer stops the micrometer screw advance it discharges an electric current through lead wires 108, 109, thereby fusing or welding the cat's whisker to the wafer.

Figure 9:
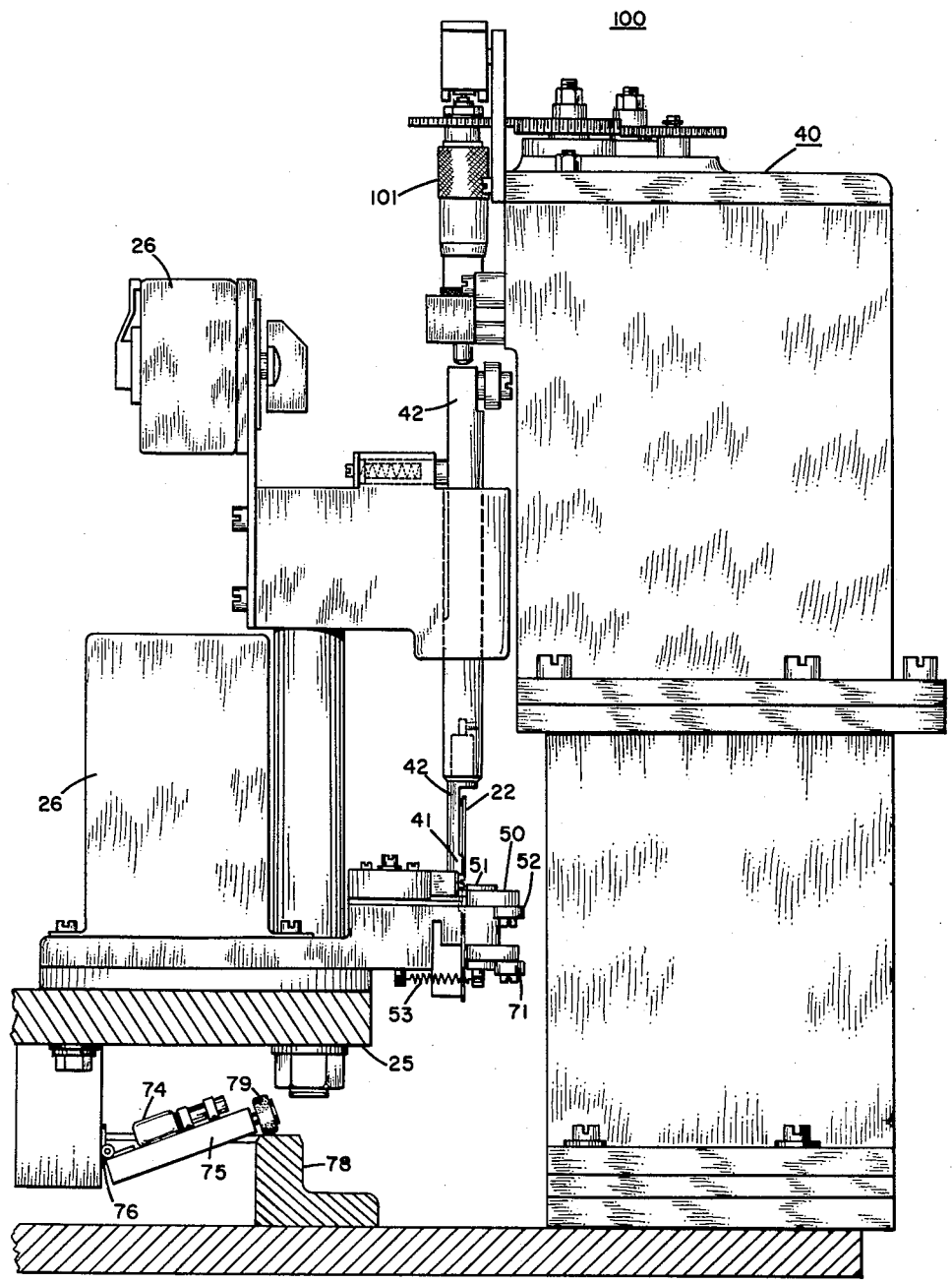
FIGURE 9 is a side view showing the fine position mechanism which quickly and accurately positions the indexed and oriented anode sub-assembly in relation to the first sub-assembly.

A mercury switch is used to turn on the heater coil 33. The switch is shown in FIGURE 9 and comprises an enclosure 74 mounted on an arm 75 hinged at 76 to a plate 77 connected to the rotatable table 25. A stationary cam 78 is positioned in respect to the arm 75 so that a rotatable bearing element 79 connected to the arm 75 will ride on the cam 78. As shown the arm is elevated to cause the mercury in the enclosure 74 to close the contacts therein and furnish energy to the heater coil 33 associated with that particular work holder 26. The particular switch used is rated at 15 amps and carries a current of 1.5 amps, giving a 10:1 safety factor, and it is hydrogen quenched to prevent arcing.

The aforedescribed apparatus is particularly adapted to making germanium diodes. In the construction of silicon diodes the fine advance unit shown in FIGURES 9 and 10 is not needed, and in their place a modified cam track (FIG. 4) is used. The modified cam track has a portion 84, shown in dotted lines, which gently, yet positively positions the anode holding arm 42, causing it to complete the positioning of the anode in respect to the first seal.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. The method of assembling first and second semi-conductive sub-assembly devices which comprises the steps of holding said first sub-assembly device in a heater by means of gripping mechanism in engagement with the sides of the first device at a location above the bottom thereof, pushing the first device down within the heater, utilizing a portion of the heater as an index to limit the motion of the first device down within the heater thereby positively locating the first device in respect to said heater irrespective of deformities on the bottom of the first device thereafter indexing a second sub-assembly device into close proximity to said first device and energizing said heater to fuse together the said two-sub-assembly devices to form a semi-conductor.

2. The method of assembling first and second semi-conductive sub-assembly devices which comprises the steps of holding said first sub-assembly device in a heater by means of first and second jaw means engaging the device at a glass portion thereof and at a wire portion thereof respectively, relieving the grip on said glass portion, pushing the first portion down within said heater against the grip of said jaw means, utilizing a portion of said heater as an index to limit the motion of the first device down within the heater thereby positively locating said first device in respect to said heater irrespective of deformities on the bottom of said first device, thereafter indexing a second sub-assembly device including a glass portion into close proximity to said first device and energizing said heater to fuse together the glass portions of said two sub-assembly devices to form a semi-conductor device.

3. The method of assembling a first semi-conductor sub-assembly including a glass tube open at one end to a second semi-conductor sub-assembly including a glass bead which comprises the steps of holding loosely said glass tube sub-assembly in a heater, pushing the glass tube sub-assembly into said heater, utilizing a portion of said heater as an index to limit the motion of the glass tube down within the heater thereby positively locating said glass tube in respect to said heater, thereafter indexing the glass bead sub-assembly into the open end of said glass tube and energizing said heater to fuse together the glass tube and the glass bead to form a semi-conductor device.

4. The method of assembling a first semi-conductor sub-assembly including a glass tube open at one end and sealed at its other end to a second semi-conductor sub-assembly including a glass bead, which comprises the steps of holding loosely said glass tube sub-assembly in a heater, pushing the glass tube into said heater, utilizing a portion of said heater as an index to limit the motion of the glass tube down within the heater thereby positively locating said glass tube in respect to said heater, clamping said glass tube in said positively located position utilizing clamping jaw means in engagement with said glass tube at a location well away from the distorted sealed end of said tube, thereafter indexing the glass bead sub-assembly into the open end of said glass tube and energizing the heater to fuse together the glass tube and the glass bead to form a semi-conductor device.

References Cited in the file of this patent

UNITED STATES PATENTS 2,694,169     North et al. _____ Nov. 9, 1954